(No Model.)

R. T. SMITH.
STREET RAILWAY SWITCHING DEVICE.

No. 459,419. Patented Sept. 15, 1891.

Witnesses
T. A. Connors
C. A. Greeley

Inventor
Roswell T. Smith
by
William B. Greeley
Attorney

THE NORRIS PETERS CO., PHOTO-LITHO., WASHINGTON, D. C.

UNITED STATES PATENT OFFICE.

ROSWELL T. SMITH, OF NASHUA, NEW HAMPSHIRE.

STREET-RAILWAY SWITCHING DEVICE.

SPECIFICATION forming part of Letters Patent No. 459,419, dated September 15, 1891.

Application filed January 24, 1891. Serial No. 378,969. (No model.)

*To all whom it may concern:*

Be it known that I, ROSWELL T. SMITH, of Nashua, in the county of Hillsborough and State of New Hampshire, have invented certain new and useful Improvements in Street-Railway Switching Devices, of which the following is a specification.

My invention relates to that form of switching devices which is shown and described in my patent, No. 433,547, issued August 5, 1890, wherein a guide-wheel carried by a movable bracket on the truck-frame is employed to push the car from the main track to the turn-out by engagement with a fixed guide-rail.

The present improvements relate particularly to the means for moving the guide-wheel into or out of position to engage with the guide-rail.

Figure 1:
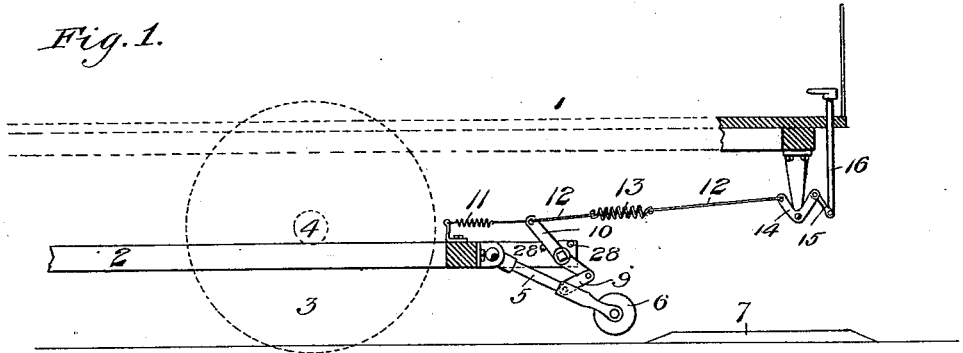
Figure 2:
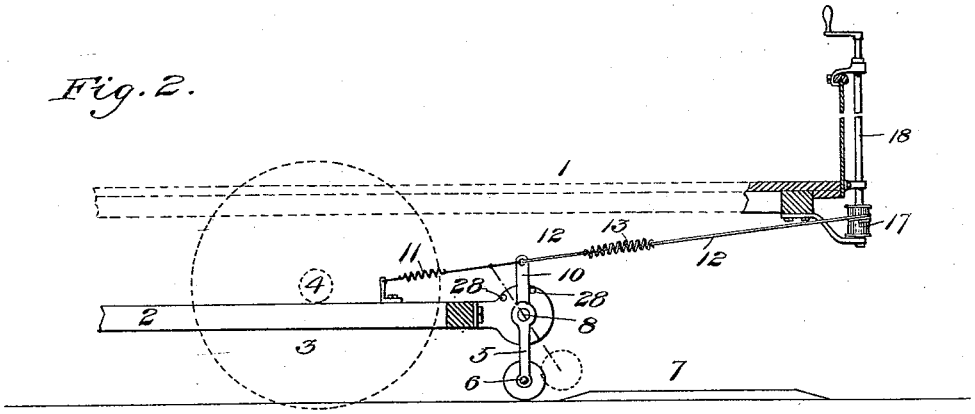
Figure 3:
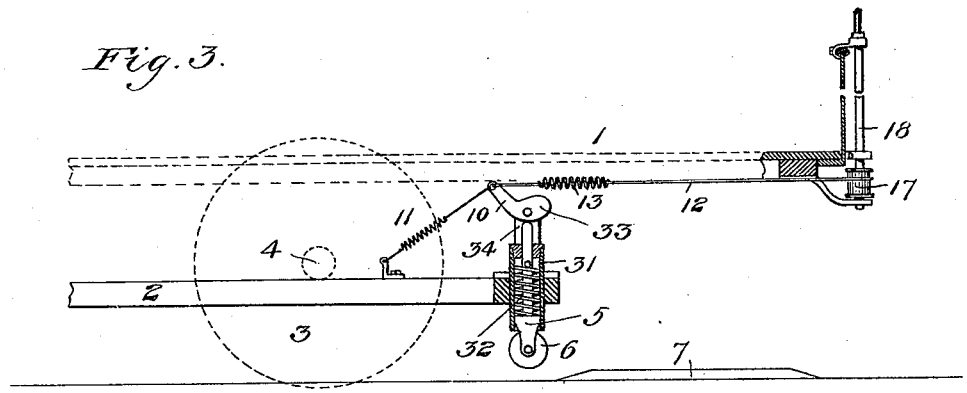
Figure 4:
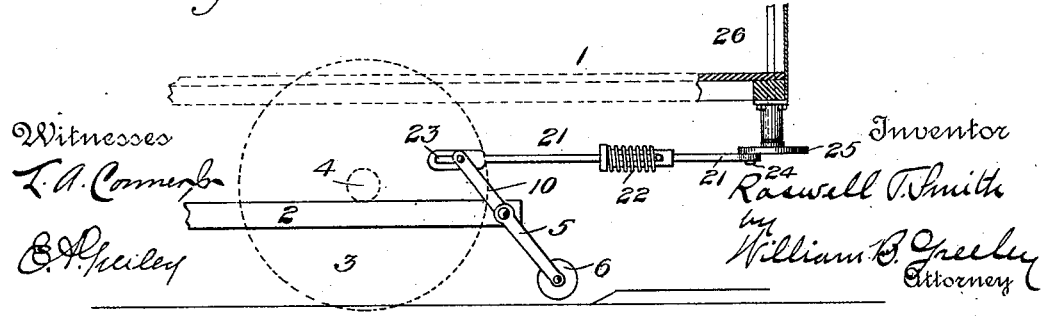

In the drawings, Figure 1 is a longitudinal sectional view of a portion of a car having my improved device applied thereto, parts being shown in dotted lines; and Figs. 2, 3, and 4 are similar views illustrating different forms of the device.

In all the figures the car-body 1, truck-frame 2, wheels 3, and axle 4 are and may be all as usual.

In the construction presented in Fig. 1 the guide-wheel 6, which is adapted to engage with the guide-rail 7, is carried by a movable support 5, pivoted to the truck-frame. A lever 10 is also pivoted upon the truck-frame and is adapted to transmit its movement to the support 5 through the link 9 to raise or lower the wheel 6. A spring 11, having one end connected to the truck-frame and the other to the end of the lever 10, serves to hold the same normally in its retracted position and the wheel 6 elevated. A connector 12, preferably having an interposed spring 13, is attached at one end to the lever 10 and at the other to a device under the control of the car-driver, whereby he may conveniently apply power at the end of the connector to move the lever 10 against the force of the spring 11 and depress the wheel 6. The means shown in said Fig. 1 consist of a bell-crank 14, connected by a link 15 with a treadle 16, whereby the driver may control the position of the wheel 6 by his foot. Other means are shown in the other figures by which the position of the wheel 6 is controlled by the driver's hand. The spring 13 is stiffer than the spring 11 and is interposed in the connector 12 to prevent breakage by allowing the parts to yield in case the guide-wheel strikes an obstruction or when the car-body oscillates with respect to the truck-frame.

In Fig. 2 the movable support 5 for the wheel 6 is pivotally supported by the truck-frame, and the lever 10 is connected therewith either directly or through the medium of the pivotal shaft 8. The lever 10 is retracted by a spring 11 and drawn forward by a connector 12, as before; but the connector 12, instead of being attached to a bell-crank, is attached to a drum 17 on a hand-shaft 18, by which the driver may apply power at the end of the connector to move the lever 10, as before.

In Fig. 3 the movable support 5 slides in a guide 31, carried by the truck-frame, and is held normally in elevated position by a spring 32. The lever 10 is pivoted upon a bracket 34 and transmits its movement to the movable support 5 through a cam 33, formed on the pivot end of the lever and against which the support 5 is pressed by the spring 32. The means for actuating the lever are represented as like the means shown in Fig. 2.

The connector 12 is not necessarily flexible, except so much of it as may pass about the drum 17 when such drum is employed, but may be a rod or bar. As represented in Fig. 4, this rod or bar 21 is preferably made in two parts, with an interposed spring 22 to permit yielding under strain, and is connected at one end, preferably by a slotted connection 23, to permit yielding in one direction with the lever 10 and at the other end with a pin 24 in a crank or disk 25, carried by a hand-shaft 26.

As represented in Figs. 1 and 2, stop-pins 28 may be employed to limit the movement of the lever 10. It is desirable that the guide-wheel should be held firmly in fixed relation to the track, regardless of the oscillations of the car-body. This end is secured by pivoting the lever 10 to the truck-frame and providing the stops to limit its motion. The lever being held firmly against the stop, the oscillations of the car-body will be compensated for by the yielding of the hand or foot of the driver or by the yielding of the spring in the connector.

Various other modifications in the form of parts of my device may be made without departing from the spirit of my invention.

I claim—

1. In a switching device, the combination of a guide-wheel, a movable support therefor carried by the truck-frame, a lever pivotally supported on the truck-frame, means to transmit the movement of said lever to said support, a retracting-spring for said lever, a connector attached to said lever, and a treadle and bell-crank for applying power at the end of said connector, substantially as described.

2. In a switching device, the combination of a guide-wheel, a movable support therefor carried by the truck-frame, a lever pivotally supported on the truck-frame, means to transmit the movement of said lever to said support, a retracting-spring for said lever, a second spring and connector attached to said lever, and means to apply power at the end of said connector, substantially as described.

3. In a switching device, the combination of a guide-wheel, a movable support therefor carried by the truck-frame, a lever, means to transmit the movement of said lever to said support, a bell-crank, a connector and interposed spring between said lever and bell-crank, and a treadle connected to said bell-crank, substantially as described.

4. In a switching device, the combination of a guide-wheel, a movable support therefor, a lever, a link connecting said lever and support, a retracting-spring for said lever, a bell-crank, a connector between said lever and bell-crank, and a treadle connected to said bell-crank, substantially as described.

5. In a switching device, the combination of the truck-frame, a guide-wheel, a movable support therefor carried by the truck-frame, a lever, also carried by said frame, means to transmit the movement of said lever to said support, stops to limit the movement of said lever and thereby hold the guide-wheel in fixed relation to the truck-frame, a connector attached to said lever, and means to apply power to said connector, substantially as described.

6. In a switching device, the combination of the truck-frame, a guide-wheel, a movable support therefor carried by the truck-frame, a lever, also carried by said frame, means to transmit the movement of said lever to said support, stops to limit the movement of said lever, a yielding connector attached to said lever, and means to apply power to said connector, substantially as described.

In witness whereof I have hereunto set my hand.

ROSWELL T. SMITH.

Witnesses:
W. H. LOVEJOY,
ALICE L. INGALLS.